(12) United States Patent
Maertens et al.

(10) Patent No.: US 12,313,105 B2
(45) Date of Patent: May 27, 2025

(54) PIECE OF FURNITURE

(71) Applicant: Inter IKEA Systems B.V., Delft (NL)

(72) Inventors: Luc Maertens, Ardooie (BE); Luc Deman, Izegem (BE); Guy Van Hooydonck, Schoten (BE); Benny Schacht, Vlamertinge (BE)

(73) Assignee: Inter IKEA Systems B.V., Delft (NL)

( * ) Notice: Subject to any disclaimer, the term of this patent is extended or adjusted under 35 U.S.C. 154(b) by 0 days.

(21) Appl. No.: 18/772,747

(22) Filed: Jul. 15, 2024

(65) Prior Publication Data

US 2024/0384739 A1 Nov. 21, 2024

Related U.S. Application Data

(63) Continuation of application No. 18/350,280, filed on Jul. 11, 2023, now Pat. No. 12,071,966, which is a
(Continued)

(30) Foreign Application Priority Data

Oct. 31, 2014 (BE) .................................. 2014/5044

(51) Int. Cl.
*F16B 12/12* (2006.01)
*A47B 47/00* (2006.01)
*F16B 12/46* (2006.01)

(52) U.S. Cl.
CPC .............. *F16B 12/12* (2013.01); *F16B 12/46* (2013.01); *A47B 47/0075* (2013.01); *A47B 2230/0081* (2013.01); *F16B 2012/466* (2013.01)

(58) Field of Classification Search
None
See application file for complete search history.

(56) References Cited

U.S. PATENT DOCUMENTS 3,600,052 A 8/1971 Marateck
4,060,949 A 12/1977 Busse
(Continued)

FOREIGN PATENT DOCUMENTS

DE 9419199 U1 1/1995
DE 102007058662 A1 6/2009
(Continued)

OTHER PUBLICATIONS

"Regissör—Bookshelf," Inter IKEA Systems B>V>, Feb. 12, 2013, 6 pages.
(Continued)

*Primary Examiner* — Jonathan P Masinick
(74) *Attorney, Agent, or Firm* — Workman Nydegger

(57) ABSTRACT

A piece of furniture, comprising a first and second furniture part, which are coupled to each other at an angle by means of mechanical coupling means. A female part is made as an oblong slot in the second furniture part with an insertion opening for introducing a male part. When coupling the first furniture part and the second furniture part to each other, the male part is brought from an insertion position in the insertion opening to an end position in the female part by moving the male part and the female part along each other. The male part is situated on a narrow end of the first furniture part and is positioned with its center line between the central plane of the first furniture part and the inner side of the first furniture part. The slot is realized in the inwardly directed flat side of the second furniture part.

20 Claims, 6 Drawing Sheets

Related U.S. Application Data continuation of application No. 17/074,052, filed on Oct. 19, 2020, now Pat. No. 11,739,779, which is a continuation of application No. 15/522,847, filed as application No. PCT/IB2015/058116 on Oct. 21, 2015, now Pat. No. 10,844,891.

(56) References Cited

U.S. PATENT DOCUMENTS

| | | | |
|---|---|---|---|
| 4,599,841 | A | 7/1986 | Haid |
| 5,478,145 | A | 12/1995 | Kamachi |
| 6,113,205 | A | 9/2000 | Kuo |
| 9,175,703 | B2 | 11/2015 | Maertens et al. |
| 9,447,804 | B2 | 9/2016 | Andersson et al. |
| 9,534,623 | B2 | 1/2017 | Andersson et al. |
| 9,719,542 | B2 | 8/2017 | Cappelle et al. |
| 10,104,960 | B2 | 10/2018 | Devos et al. |
| 10,138,917 | B2 * | 11/2018 | Koch ............... F16B 5/01 |
| 10,648,498 | B2 * | 5/2020 | Sjöstedt ............ F16B 21/09 |
| 10,716,401 | B2 * | 7/2020 | Dalstam ............ F16B 12/24 |
| 10,865,822 | B2 * | 12/2020 | Andersson ........ A47B 96/205 |
| 11,378,115 | B2 * | 7/2022 | Sjostedt ............ F16B 12/10 |
| 11,378,116 | B2 * | 7/2022 | Bastian ............. F16B 12/12 |
| 11,517,108 | B2 * | 12/2022 | Brendel ............ F16B 12/32 |
| 11,530,716 | B2 * | 12/2022 | Bastian ............. F16B 21/09 |
| 2011/0260592 | A1 | 10/2011 | Lin et al. |
| 2013/0071172 | A1 | 3/2013 | Maertens et al. |
| 2013/0239509 | A1 * | 9/2013 | Wang ............... F16B 12/125 52/704 |
| 2013/0287484 | A1 * | 10/2013 | Phillips ............ A47B 87/008 403/298 |
| 2014/0205373 | A1 | 7/2014 | Andersson et al. |
| 2018/0283431 | A1 | 10/2018 | Andersson et al. |

FOREIGN PATENT DOCUMENTS

| | | |
|---|---|---|
| EM | 002435131 | 3/2014 |
| EP | 2641505 A1 | 9/2013 |
| FR | 2445461 A3 | 7/1980 |
| WO | 2010070472 A2 | 6/2010 |
| WO | 2011151758 A2 | 12/2011 |
| WO | 2013104422 A1 | 7/2013 |
| WO | 2013118075 A1 | 8/2013 |

OTHER PUBLICATIONS

"Regissör—Cupboard," Inter IKEA Systems B.V., Sep. 24, 2013, 10 pages.

"Regissör—Table," Inter IKEA Systems B.V., Aug. 21, 2014, 8 pages.

"IKEA—Regissör Serie," IKEA Nederland, retrieved from https://www.youtube.com/watch?v=POR4mwOZjsY, Sep. 26, 2014, 14 pages.

Notice of Opposition to corresponding EP Application No. 15801933.1, Sep. 11, 2019.

Belgium Search Report for corresponding Belgium Application No. 201405044, Aug. 11, 2015.

International Search Report from corresponding International PCT Application No. PCT/IB2015/058116, Feb. 17, 2016.

* cited by examiner

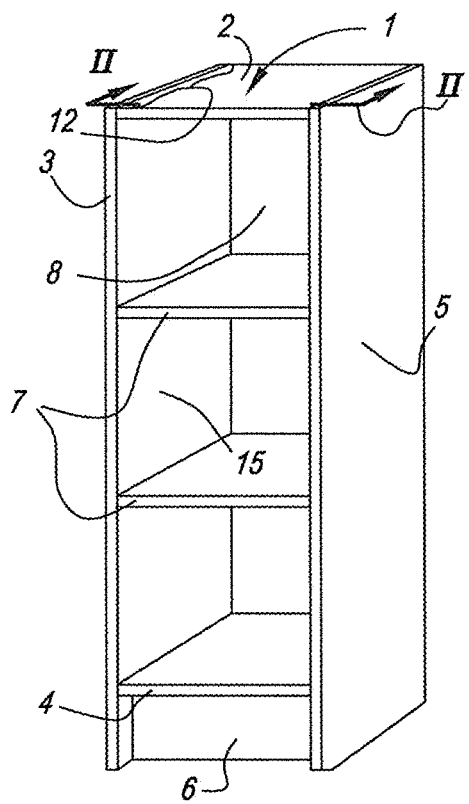
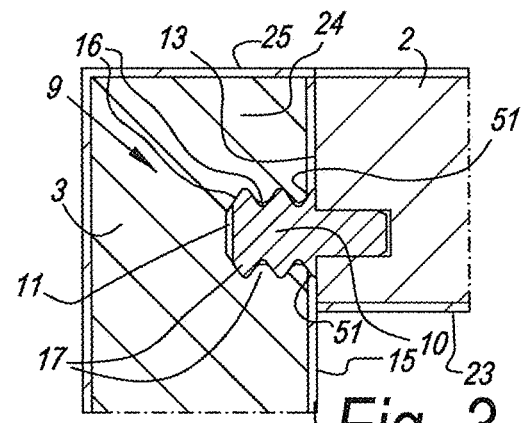
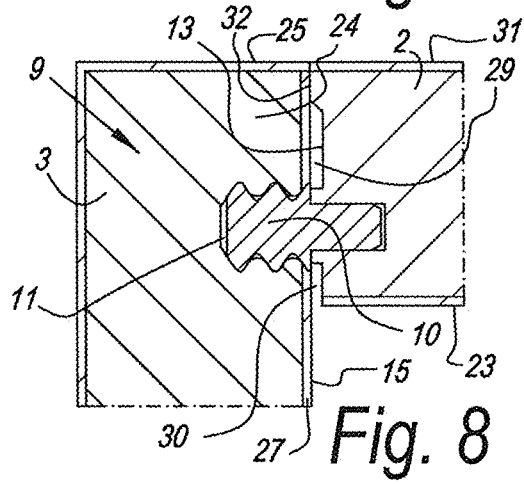
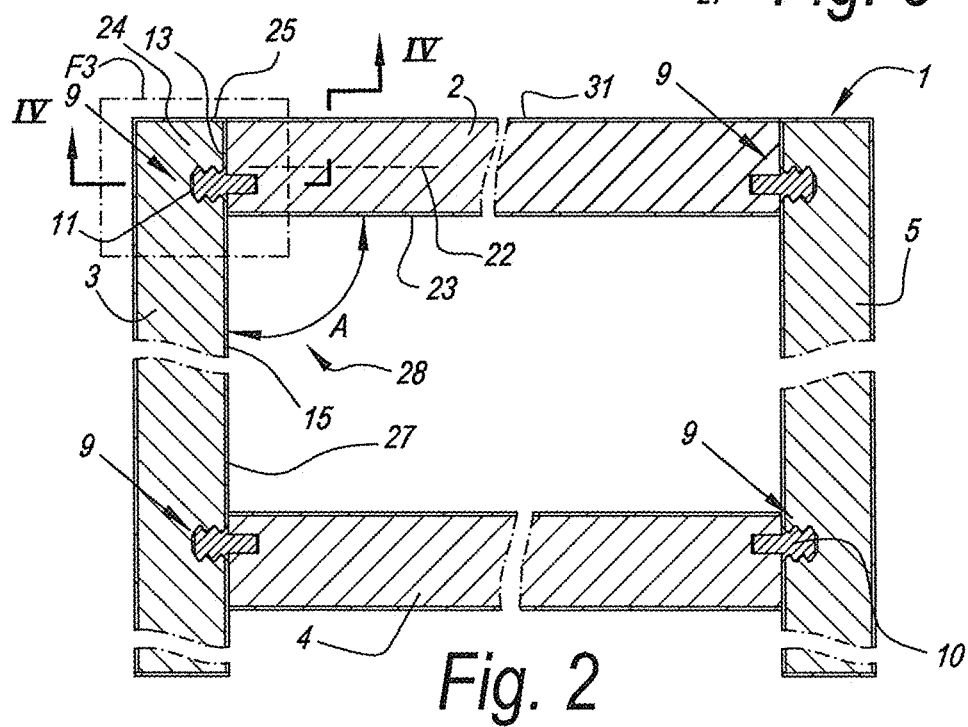
Fig. 1
Fig. 3
Fig. 8
Fig. 2

PIECE OF FURNITURE

BACKGROUND

1. Field of the Disclosure

This invention relates to a composed element, in particular to a piece of furniture, as well as to a corner connection which is applied therewith.

More particularly, the invention relates to a piece of furniture, which comprises at least a first furniture part and a second furniture part, which are coupled to each other, can be coupled to each other, respectively, at an angle. Preferably, the respective furniture parts relate to panel-shaped elements. Herein, the invention relates to any type of composed element which comprises at least two or more parts, such as panel-shaped elements, irrespective of the field of application, and irrespective of the fact whether the composed element substantially consists exclusively of these parts or panel-shaped elements, or whether these parts only form a component thereof.

Although the invention can be applied in any application, it is primarily intended for application in the furniture sector, for loose furniture a well as for built-in furniture, such as dressing furniture, room dividers, and the like.

More particularly, the invention relates to connections between furniture parts, such as between panel-shaped elements, which can be realized in a smooth manner and are suitable for being employed with furniture which are sold in dismounted condition and have to be mounted by the buyer himself. Herein, this primarily relates to so-called flat-pack furniture.

Still more particularly, the invention relates to a piece of furniture, wherein this piece of furniture comprises at least a first furniture part and a second furniture part, which are coupled at an angle by means of mechanical coupling means, and wherein said coupling means consist at least of a male part provided on the first furniture part and a cooperating therewith female part provided on the second furniture part, wherein said female part is made as an oblong slot in said second furniture part and wherein said male and female part comprise one or more cooperating grooves and protrusions, wherein said slot comprises an insertion opening for introducing said male part and wherein, when coupling the first furniture part and the second furniture part to each other, the male part is brought from an insertion position in said insertion opening to an end position in said female part by moving the male part and the female part along each other in the longitudinal direction of said slot, wherein said grooves and protrusions in said end position cooperate such that a coupling of the first and second furniture part is obtained.

2. Related Art

Such piece of furniture is known from WO 2013/104422 and US 2014/205,373, wherein a first furniture part is provided with respectively three male parts on opposite ends. These male parts respectively are made as dowels which are glued into the respective end or are attached by means of a connection obtained by an ultrasonic treatment. Herein, each time a tensioning effect is effected between two furniture parts by means of the cooperating grooves and protrusions. This tensioning is achieved in that the male part and the female part mutually are made of another material and in particular in that the material of the grooves of the female part is softer than the material of the grooves of the male part. The female part is made as an oblong slot in the inwardly directed flat side of one of the furniture parts. The slot is realized in the proximity of the edge of this furniture part. The material requirements and the positioning of the coupling means can weaken the whole and may lead to the occurrence of a variety of risks. For example, there is the risk that the soft material on the edge of the furniture part may break off. The piece of furniture of the aforementioned documents possibly will lead to installation faults. Moreover, the production of the furniture parts, in particular connecting the male parts onto the respective furniture part, requires particular treatments.

SUMMARY

The present invention, according to its different independent aspects, primarily relates to alternative furniture with a first and second furniture part which are coupled at an angle by means of mechanical coupling means. According to various preferred embodiments thereof, advantages are obtained in respect to the state of the art.

To this aim, the invention, according to a first independent aspect, relates to a piece of furniture, wherein this piece of furniture comprises at least a first furniture part and a second furniture part, which are coupled to each other at an angle by means of mechanical coupling means, and wherein said coupling means consist at least of a male part provided on the first furniture part and a cooperating therewith female part provided on the second furniture part, wherein said female part is made as an oblong slot in said second furniture part and wherein said male and female part comprise one or more cooperating grooves and protrusions, wherein said slot comprises an insertion opening for introducing said male part and wherein, when coupling the first furniture part and the second furniture part to each other, the male part is brought from an insertion position in said insertion opening to an end position in said female part by moving the male part and the female part along each other in the longitudinal direction of said slot, wherein said grooves and protrusions in said end position cooperate such that a coupling of the first and second furniture part is obtained, with the characteristic that said male part is situated on a narrow end of said first furniture part and is positioned with its center line between the central plane of the first furniture part and the inner side of the first furniture part, whereas said slot is realized in the inwardly directed flat side of the second furniture part. As the male part is provided towards the inner side of the piece of furniture, said slot of the female part can be realized at a distance from the distal end of the second furniture part, such that the risk of the respective edge breaking off can be minimized.

Preferably, at least two thirds of the male part are situated between said central plane and the inwardly directed side of the first furniture part. Still better, the male part is situated entirely between the central plane and the inwardly directed side of the first furniture part.

According to a second independent aspect, the invention relates to a piece of furniture, wherein this piece of furniture comprises at least a first furniture part and a second furniture part, which are coupled to each other at an angle by means of mechanical coupling means, and wherein said coupling means consist at least of a male part provided on the first furniture part and a cooperating therewith female part provided on the second furniture part, wherein said female part is made as an oblong slot in said second furniture part and wherein said male and female part comprise one or more cooperating grooves and protrusions, wherein said slot comprises an insertion opening for introducing said male part and wherein, when coupling the first furniture part and the second furniture part to each other, the male part is brought from an insertion position in said insertion opening to an end position in said female part by moving the male part and the female part along each other in the longitudinal direction of said slot, wherein said grooves and protrusions in said end position cooperate such that a coupling of the first and second furniture part is obtained, with the characteristic that said male part comprises one or more recesses which effect the elasticity of one or more of the respective grooves and/or protrusions. As the elasticity of the male and/or the female part now can be influenced by providing recesses, the male and female parts can be realized in a similar material, more particularly in equally hard or soft material. Said recesses can be situated internally in the respective part or can extend from an outer edge inwards in the respective part.

According to a third independent aspect, the present invention relates to a piece of furniture, wherein this piece of furniture comprises at least a first furniture part and a second furniture part, which are coupled to each other at an angle by means of mechanical coupling means, and wherein said coupling means consist at least of a male part provided on the first furniture part and a cooperating therewith female part provided on the second furniture part, wherein said female part is made as an oblong slot in said second furniture part and wherein said male and female part comprise one or more cooperating grooves and protrusions, wherein said slot comprises an insertion opening for introducing said male part and wherein, when coupling the first furniture part and the second furniture part to each other, the male part is brought from an insertion position in said insertion opening to an end position in said female part by moving the male part and the female part along each other in the longitudinal direction of said slot, wherein said grooves and protrusions in said end position cooperate such that a coupling of the first and second furniture part is obtained, with the characteristic that said male and/or female part consist of at least two different materials, wherein one or more of the respective grooves and/or protrusions is made in a more elastic or softer material than the core material of the respective male and/or female part. As the material of the male and/or the female part is made of a more elastic or of a softer material only locally, a compromise is obtained between strength and compressibility. Such part may be obtained, for example, by coating techniques, wherein the core material of the respective part is provided with a coating with a more elastic material.

According to a fourth independent aspect, the present invention relates to a piece of furniture, wherein this piece of furniture comprises at least a first furniture part and a second furniture part, which are coupled to each other at an angle by means of mechanical coupling means, and wherein said coupling means consist at least of a male part provided on the first furniture part and a cooperating therewith female part provided on the second furniture part, wherein said female part is made as an oblong slot in said second furniture part and wherein said male and female part comprise one or more cooperating grooves and protrusions, wherein said slot comprises an insertion opening for introducing said male part and wherein, when coupling the first furniture part and the second furniture part to each other, the male part is brought from an insertion position in said insertion opening to an end position in said female part by moving the male part and the female part along each other in the longitudinal direction of said slot, wherein said grooves and protrusions in said end position cooperate such that a coupling of the first and second furniture part is obtained, with the characteristic that said male part is gluelessly connected to the first furniture part. Such glueless connection can be realized in a variety of possibilities. Below, various possibilities are listed, while not attempting to be exhaustive:

the possibility that said glueless connection consists at least of a mechanical coupling connection by means of one or more hooks and undercuts;

the possibility that said glueless connection consists at least of that the male part, on its end where it is connected to the first furniture part, is made with grooves which cooperate with a female part with grooves, which female part is also realized in the first furniture part;

the possibility that said glueless connection consists at least of a screw thread connection.

A glueless connection offers a connection which is simpler to realize, which possibly can be realized by the end user.

According to a fifth independent aspect, the invention relates to a piece of furniture, wherein this piece of furniture comprises at least a first furniture part and a second furniture part, which are coupled to each other at an angle by means of mechanical coupling means, and wherein said coupling means consist at least of a male part provided on the first furniture part and a cooperating therewith female part provided on the second furniture part, wherein said female part is made as an oblong slot in said second furniture part and wherein said male and female part comprise one or more cooperating grooves and protrusions, wherein said slot comprises an insertion opening for introducing said male part and wherein, when coupling the first furniture part and the second furniture part to each other, the male part is brought from an insertion position in said insertion opening to an end position in said female part by moving the male part and the female part along each other in the longitudinal direction of said slot, wherein said grooves and protrusions in said end position cooperate such that a coupling of the first and second furniture part is obtained, with the characteristic that the first furniture part, preferably on a first of two opposite ends, is provided with said male part as well as at least a female part. As different coupling parts are combined on one and the same furniture part, preferably on one and the same of two opposite ends, a better stability of the whole is achieved. Thus, the material parts which are weakened by the female parts are distributed over two furniture parts, which offers a spreading of the risk of break.

According to a sixth independent aspect, the present invention relates to still another piece of furniture, wherein this piece of furniture comprises at least a first furniture part and a second furniture part, which are coupled to each other at an angle by means of mechanical coupling means, and wherein said coupling means consist at least of a male part provided on the first furniture part and a cooperating therewith female part provided on the second furniture part, wherein said female part is made as an oblong slot in said second furniture part and wherein said male and female part comprise one or more cooperating grooves and protrusions, wherein said slot comprises an insertion opening for introducing said male part and wherein, when coupling the first furniture part and the second furniture part to each other, the male part is brought from an insertion position in said insertion opening to an end position in said female part by moving the male part and the female part along each other in the longitudinal direction of said slot, wherein said grooves and protrusions in said end position cooperate such that a coupling of the first and second furniture part is obtained, with the characteristic that the first furniture part, on a first of two opposite ends, is provided with at least three male and/or female parts, wherein the relations of the distance between a first and a second of these parts, and the distance between a second and a third of these parts, is at least 1.2 and preferably at least 1.5 or 2. As the distance between the parts is clearly made different, errors and/or time loss of the user when installing the piece of furniture will be minimized. To wit, the mutually strongly differing distance allows an identification of the front and rear sides of the furniture parts.

According to a seventh independent aspect, the present invention relates to a piece of furniture, wherein this piece of furniture comprises at least a first furniture part and a second furniture part, which are coupled to each other at an angle by means of mechanical coupling means, and wherein said coupling means consist at least of a male part provided on the first furniture part and a cooperating therewith female part provided on the second furniture part, wherein said female part is made as an oblong slot in said second furniture part and wherein said male and female part comprise one or more cooperating grooves and protrusions, wherein said slot comprises an insertion opening for introducing said male part and wherein, when coupling the first furniture part and the second furniture part to each other, the male part is brought from an insertion position in said insertion opening to an end position in said female part by moving the male part and the female part along each other in the longitudinal direction of said slot, wherein said grooves and protrusions in said end position cooperate such that a coupling of the first and second furniture part is obtained, with the characteristic that the first furniture part, on a first of two opposite ends, is provided with at least a male part, and wherein the first furniture part, on a second of these two opposite ends, comprises a second male part, which is least distant from said first male part, and that the first and the second male parts, in respect to the longitudinal direction of the respective ends, are offset in mutual respect, or, in other words, are not positioned straight or inclined opposite to each other. By this particular positioning, an additional stability can be created.

According to an eighth independent aspect, the present invention relates to still another piece of furniture, wherein this piece of furniture comprises at least a first furniture part and a second furniture part, which are coupled to each other at an angle by means of mechanical coupling means, and wherein said coupling means consist at least of a male part provided on the first furniture part and a cooperating therewith female part provided on the second furniture part, wherein said female part is made as an oblong slot in said second furniture part and wherein said male and female part comprise one or more cooperating grooves and protrusions, wherein said slot comprises an insertion opening for introducing said male part and wherein, when coupling the first furniture part and the second furniture part to each other, the male part is brought from an insertion position in said insertion opening to an end position in said female part by moving the male part and the female part along each other in the longitudinal direction of said slot, wherein said grooves and protrusions in said end position cooperate such that a coupling of the first and second furniture part is obtained, with the characteristic that said female part is provided in a side of the second furniture part, which is provided with a layer-shaped covering. Preferably, this layer-shaped covering, in coupled condition, extends from on the inner side of the piece of furniture up to between the distal end of the first furniture part.

Preferably, said male part is provided in a narrow side of the first furniture part, wherein this side is free from layer-shaped coverings.

Preferably, said slot comprises a bevel or other chamfer.

According to a ninth independent aspect, the present invention relates to still another piece of furniture, wherein this piece of furniture comprises at least a first furniture part and a second furniture part, which are coupled to each other at an angle by means of mechanical coupling means, and wherein said coupling means consist at least of a male part provided on the first furniture part and a cooperating therewith female part provided on the second furniture part, wherein said female part is made as an oblong slot in said second furniture part and wherein said male and female part comprise one or more cooperating grooves and protrusions, wherein said slot comprises an insertion opening for introducing said male part and wherein, when coupling the first furniture part and the second furniture part to each other, the male part is brought from an insertion position in said insertion opening to an end position in said female part by moving the male part and the female part along each other in the longitudinal direction of said slot, wherein said grooves and protrusions in said end position cooperate such that a coupling of the first and second furniture part is obtained, with the characteristic that the first furniture part, on a first of two opposite ends, is provided with at least four male and/or female parts. Such a high number of local coupling parts results in a high strength in the corner connection.

According to a tenth independent aspect, the present invention relates to still another piece of furniture, wherein this piece of furniture comprises at least a first furniture part and a second furniture part, which are coupled to each other at an angle by means of mechanical coupling means, and wherein said coupling means consist at least of a male part provided on the first furniture part and a cooperating therewith female part provided on the second furniture part, wherein said female part is made as an oblong slot in said second furniture part and wherein said male and female part comprise one or more cooperating grooves and protrusions, wherein said slot comprises an insertion opening for introducing said male part and wherein, when coupling the first furniture part and the second furniture part to each other, the male part is brought from an insertion position in said insertion opening to an end position in said female part by moving the male part and the female part along each other in the longitudinal direction of said slot, wherein said grooves and protrusions in said end position cooperate such that a coupling of the first and second furniture part is obtained, with the characteristic that in the coupled condition of the first furniture part and the second furniture part free spaces or chambers are present in the coupling zone, wherein there is at least a free space between the distal end of the first furniture part and either the distal end of the second furniture part, or the inwardly directed flat side of the second furniture part. Such free spaces can lead to a better connection of the furniture parts to one or more of their surfaces visible in the piece of furniture. The presence of free spaces restricts the size of the contact surfaces between both furniture parts and allows obtaining a good connection of the remaining contact surfaces. The moving along each other of the male and female part can be performed with less force, and a possible compression of the furniture parts towards each other can be guaranteed more simply.

Preferably, said free chambers are air chambers, however, one or more of such chambers may also be filled with compressible material.

Below follow some preferred embodiments, which can be applied generally and thus to all independent aspects. Preferably, said first and second furniture parts in the aforementioned end position are pressed towards each other by means of the cooperating grooves and protrusions. Herein, the measures of said second and/or third aspects are particularly advantageous.

Preferably, the grooves and/or protrusions are compressed during the aforementioned shifting.

Preferably, said grooves and protrusions of cooperating female and male parts are made mutually inclined.

Preferably, the male part is made as a dowel or pin, which is made with a profile, such that it, as aforementioned, comprises one or more grooves or protrusions.

Preferably, the first furniture part connects with its distal or narrow end to the inwardly directed side of the second furniture part in order to thereby include an angle of 90 degrees or approximately 90 degrees. However, it is not excluded that the second through tenth aspects are applied with furniture of which the first furniture part connects with its distal or narrow end against the distal or narrow end of the second furniture part in order to thereby include an angle of 90 degrees or approximately 90 degrees. Herein, this may relate to a so-called miter coupling.

Further characteristics of the invention will become clear from the following description and the appended claims.

BRIEF DESCRIPTION OF THE DRAWINGS

With the intention of better showing the characteristics of the invention, herein after, as an example without any limitative character, some preferred embodiments are described, with reference to the accompanying drawings, wherein:

FIG. 1 in perspective represents a piece of furniture having the characteristics of the invention;

FIG. 2, at a larger scale, represents a cross-section according to the line II-II represented in FIG. 1;

FIG. 3, at a larger scale, represents a view on the area indicated by F3 in FIG. 2;

FIGS. 8 to 20, in a view similar to that of FIG. 3, represent variants;

DETAILED DESCRIPTION OF PREFERRED EMBODIMENTS OF THE DISCLOSURE

Figure 4:
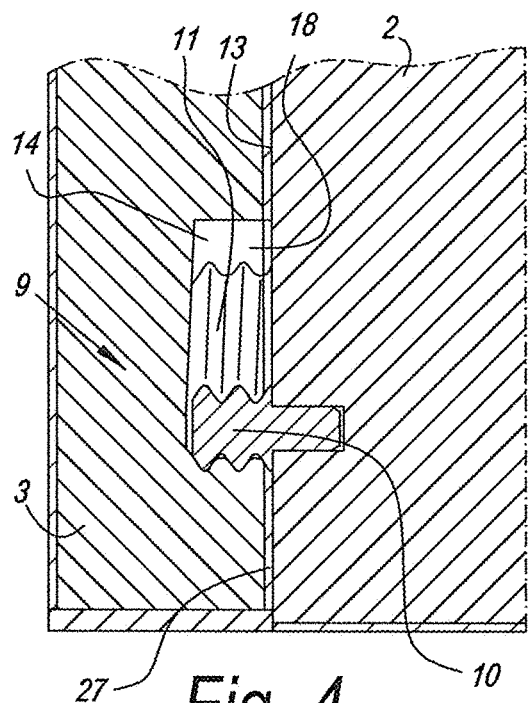
FIG. 4, at the same scale as in FIG. 3, represents a cross-section according to the line IV-IV represented in FIG. 2.

FIG. 1 represents a piece of furniture 1 which consists of a plurality of furniture parts 2-5, in this case a plurality of panel-shaped elements. The panel-shaped elements form, amongst others, both side panels 3-4, the top panel 2, the bottom panel 4, a baseboard 6, various shelves 7 and a back 8.

FIGS. 2 and 3 represent that the side panels 3-5 and, for example, the top panel 2 are coupled to each other at an angle by means of mechanical coupling means 9. In this case, the entire framework of the represented piece of furniture 1 is composed by means of such mechanical coupling means 9. The four main panels 2-3-4-5, namely both side panels 3-5, the top panel 2 and the bottom panel 4, are coupled to each other in a similar manner at an angle and include an angle A of 90 degrees or almost 90 degrees. It is not excluded that one or more of the shelves 7 and/or the baseboard 5 and/or the back 8 are attached to the framework in such manner as well.

The coupling means 9 consist at least of a male part 10 and a female part 11. It is evident that a plurality of such male parts 10 and female coupling parts 11 can be positioned one behind the other along the coupling zone 12. Preferably, at least two or three of such coupling parts 10-11 are applied along a coupling zone 12.

FIG. 4 represents that the male part 10 in this case is provided on the distal or narrow end 13 of the top panel 2, and that the female part 11 is made as an oblong slot 14 in a side panel 3, more particularly in the inwardly directed side 15 of this side panel 3.

The male part 10 and the female part 11 in this case show a plurality of cooperating grooves 16 and protrusions 17.

Figure 5:
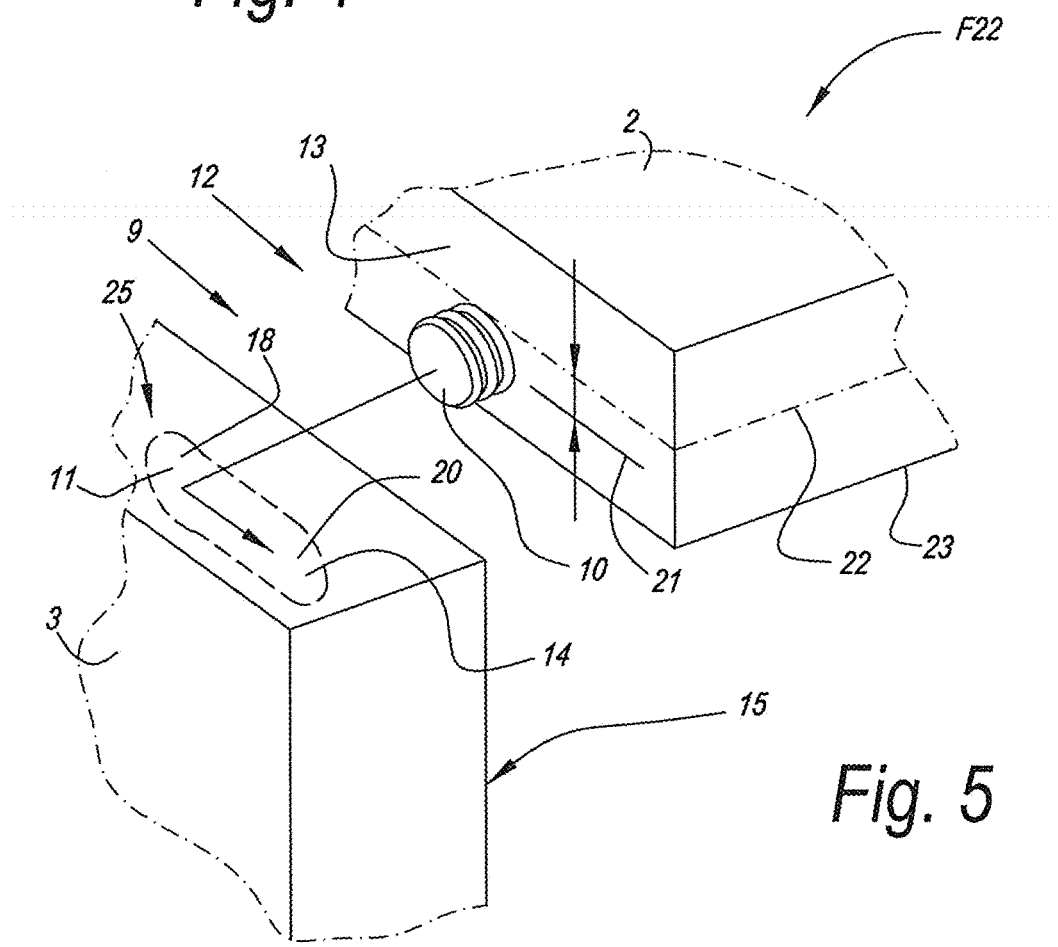
FIG. 5 in perspective represents how the furniture parts of FIG. 1 can be coupled.

FIG. 5 clearly shows that said slot 14 shows an insertion opening 18. The insertion opening 8 is made with a larger diameter than the remaining portion of the slot 14.

Figure 6:
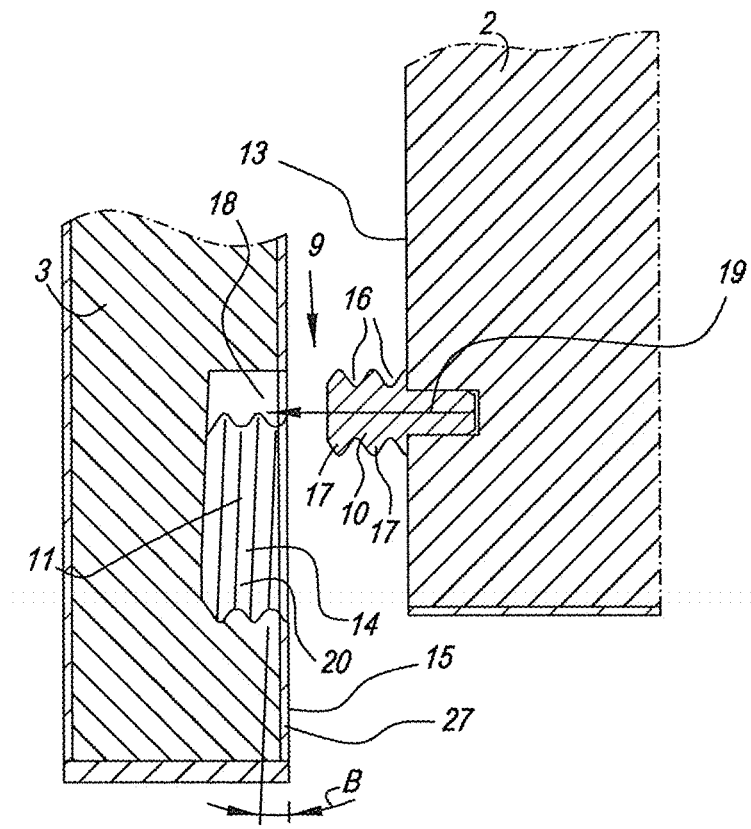
FIGS. 6 and 7, in a view similar to that of FIG. 4, represent some steps in the coupling action.

FIG. 6 represents that the male part 10 can be introduced in said slot 14 according to the arrow 19 and via the insertion opening 18.

Figure 7:
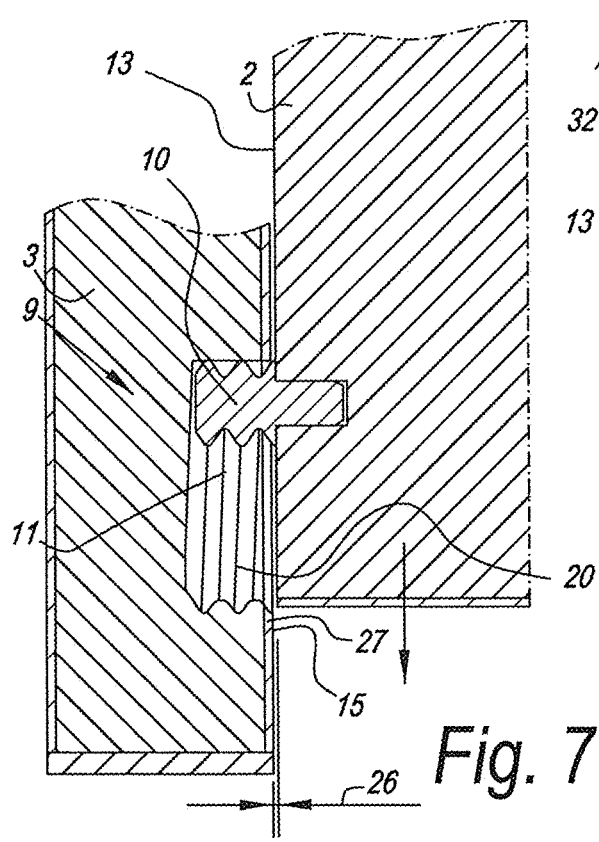

FIG. 7 represents that, when coupling the side panel 3 and the top panel 2 to each other, the male part 10 is brought from this insertion position to an end position 20 in the female part 11 by moving the male part 10 and the female part 11 along each other in the longitudinal direction of said slot 14.

In the end position 20, which is represented in FIGS. 2, 3 and 4, the aforementioned grooves 16 and protrusions 17 mutually cooperate, such that a coupling of the side panel 3 and the top panel 2 is obtained.

The particularity of the arrangement represented here is that the male part 10, in accordance with the first aspect of the invention, is positioned with its center line 21 between the central plane 22 of the top panel 2 and the inwardly directed side 23 of the top panel 2. Hereby is obtained that a considerable material part 24 remains present between the slot 14 of the female part 11 and the narrow end 25 of the side panel 3, which leads to a reduced risk of breaking.

In this example, the grooves 16 and protrusions 17 of the female part 11 are made inclined, for example, at an angle B of 2 to 20°. Hereby, it is obtained that during shifting, the narrow end 13 of the top panel 2 is pulled towards the flat side 15 of the side panel 3, such that in the end position 20 an initially present gap 26 is reduced or eliminated. It is possible to realize the inclination such that in the end position 20 a compression of both panels 2-3 is obtained, analogous to the compression of the document WO 2013/104422 mentioned in the introduction.

The embodiment represented by means of FIGS. 1 to 7 further also shows the characteristics of the eighth independent aspect. To this aim, the female part 11 is provided in a side 15 of the side panel 3, which is provided with a layer-shaped covering 27. In this case, the layer-shaped covering 27, in the coupled condition, extends from on the inner side 28 of the piece of furniture 1 up to between the distal end 13 of the first furniture part 2 and this inner side 28, or the inwardly directed flat side 15 of the second furniture part 3. The layer-shaped covering 27 accompanies the mutual shifting during the coupling action and may lead to an improved quality of the inner corner of the coupling. A possible compression effect also benefits from the presence of such layer-shaped covering 27.

FIG. 8 represents a variant wherein also the characteristics of the tenth independent aspect mentioned in the introduction are applied. In the represented coupled condition, free spaces 29-30 are present between the distal or narrow end 13 of the first furniture part 2 or the top panel and the inwardly directed flat side 15 of the second furniture part 3 or the side panel. Here, this relates to a straight coupling, wherein the respective furniture parts 2-3 adjoin each other with perpendicular or almost perpendicular sides or ends and thus no miter coupling, wherein the respective furniture parts adjoin each other with inclined-made edges, for example, at an angle between 30 and 60 degrees, preferably approximately 45 degrees.

Figure 9:
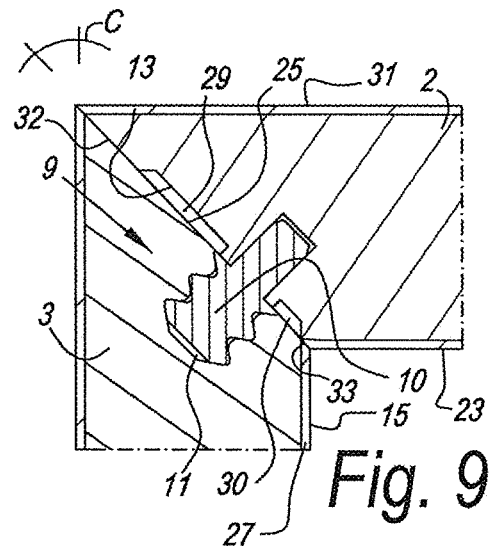

FIG. 9 represents another variant with the characteristics of the tenth independent aspect, wherein, in coupled condition, free spaces 29-30 are present between the distal or narrow end 13 of the top panel 2 and the distal or narrow end 25 of the side panel 3. Here, this relates to a so-called miter coupling, wherein the respective ends adjoin against each other at an angle C of approximately 45 degrees.

It is clear that the characteristics of the tenth aspect do not necessarily have to be combined with the characteristics of the first aspect.

FIGS. 8 and 9 also represent some preferred embodiments of the tenth independent aspect, which each can be applied separately or in combination. This relates to the following particularities:

There is at least a free space 29 between the outwardly directed side 31 of the first furniture part 2 and the male part 10. This free space 29 preferably is closed off towards the outside in that the first and the second furniture part 2-3 form a contact surface 32. There is at least a free space 30 between the inwardly directed side 23 of the first furniture part 2 and the male coupling part 10. This free space 30 may or may not be made closed towards the inside. FIG. 9 represents a closed embodiment in that the first and the second furniture part 2-3 form a contact surface 33. FIG. 8 represents an open embodiment. Such embodiment forms a better guarantee for the adjoining of the contact surfaces 32 on the outwardly directed sides 31.

Said free spaces 29-30 are formed as recesses in the distal end 13 of the first furniture part 2. Of course, it is also possible that they are formed as a recess in the inwardly directed side 15 of the second furniture part 3, or in the distal end 25 of the second furniture part 3, this latter in particular in the case of miter couplings. Also, a combination of recesses in the first and the second furniture part 2-3 is not excluded either.

Figure 10:
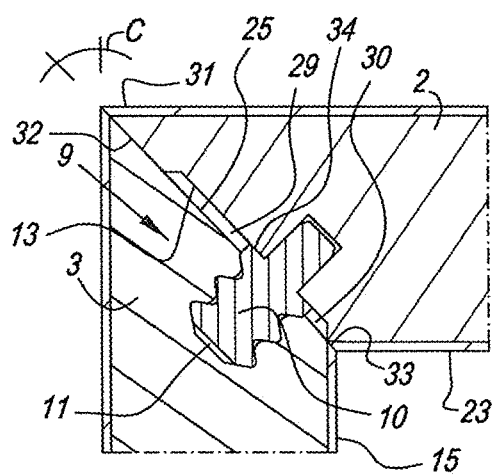

FIG. 10 represents another embodiment of the tenth independent aspect, wherein the male part 10 partially is countersunk in the narrow or distal end 13 of the first furniture part 2, in this case the top panel. By this is meant that the male part 10 protrudes from a surface 34, which latter is inwardly situated in respect to the contact surfaces 32. This is illustrated here by means of a miter coupling, however, can also be applied in a straight coupling.

Figure 11:
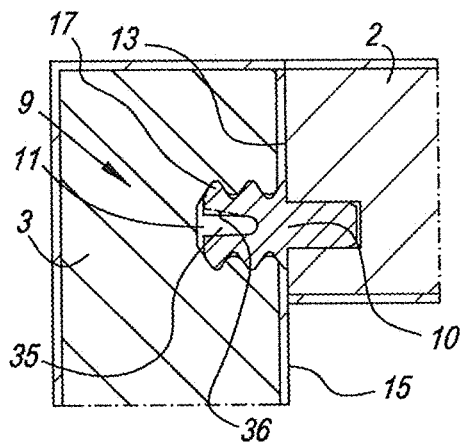

FIG. 11 represents an embodiment having, amongst others, the characteristics of the second independent aspect mentioned in the introduction. To this aim, the male part 10 comprises a recess 35, in this case realized in the depth direction of the slot 14. In dashed line 36, the relaxed condition of the male part 10 is illustrated. The respective recess 35 increases the elasticity of the male part 10, such that the protrusions 17 thereof, in the coupled condition represented here, can be bent inward. Due to the spring-back force of the male part 10, the furniture parts 2-3 are pulled towards each other. Hereby, a strong connection between the respective furniture parts 2-3 can be obtained.

Figure 12:
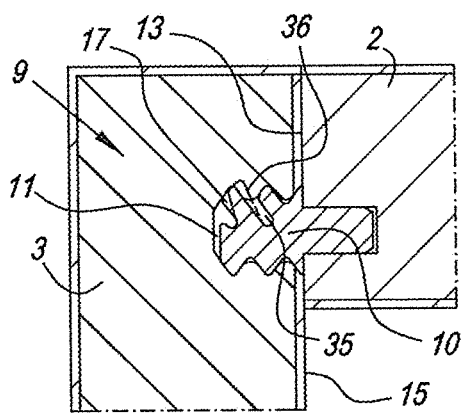

FIG. 12 shows another example of the second independent aspect, wherein the one or more recesses 35 are realized transverse to the depth direction of the slot 14. The obtained effects are similar to those in the case of FIG. 11.

Figure 13:
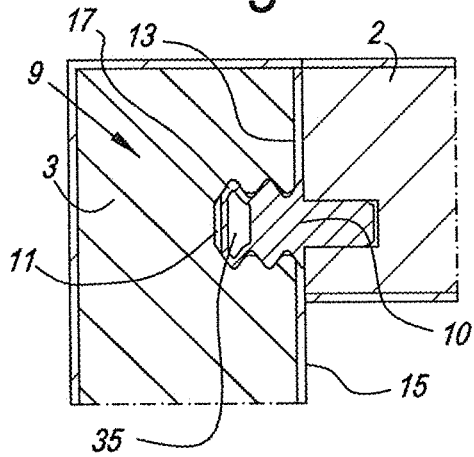

FIG. 13 represents another example of the second independent aspect, wherein the one or more recesses 35 are situated internally in the male part 10. Here, too, similar effects are achieved as in FIGS. 11 and 12.

Figure 14:
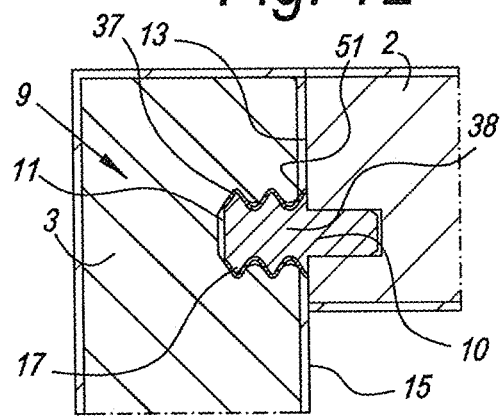

FIG. 14 represents an example of the third aspect of the invention, mentioned in the introduction, wherein the male part 10 consists of at least two different materials 37-38. Herein, the protrusions 17 are provided with a material 37 which is more elastic than the core material 38 of the male part 10. With such embodiment, similar effects can be obtained as those in the FIGS. 11 to 13, however, here rather a spring-back effect on the basis of compression of the elastic material is applied. Suitable materials for the elastic surface material 37 are for example, polyurethane or soft polyvinyl chloride. Suitable core materials 38 are, for example, acrylonitrile butadiene styrene (ABS) or hard polyvinyl chloride (rigid PVC). The surface material 37 can also be formed by a deposited layer of paraffin. The use of a different surface material 37 can also have a positive influence on the sliding features, such that coupling the male part 10 and female part 11 to each other can be performed more smoothly by means of the relative shifting movement. This is in particular the case when paraffin or polyurethane is applied as a surface material 37.

Figure 15:
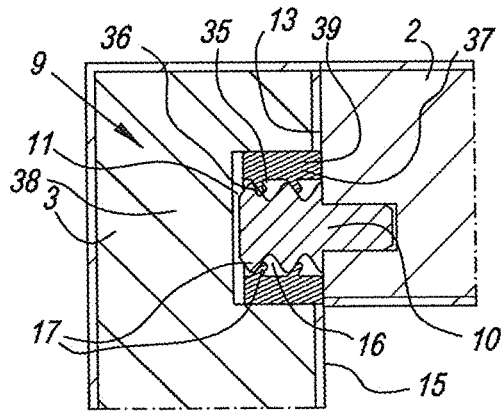

FIG. 15 represents still another particular embodiment, which combines the characteristics of the second and the third aspect. To this aim, the slot 14 of the female part 11 is at least partially formed by an insert 39 of a more elastic material 37 than the core material 38 of the second furniture part 3. Moreover, this insert 39 is provided with recesses 35, which are separated by elastically bendable lips or protrusions 17. Here, too, similar effects are achieved as in the case of FIGS. 11 to 14.

Figure 16:
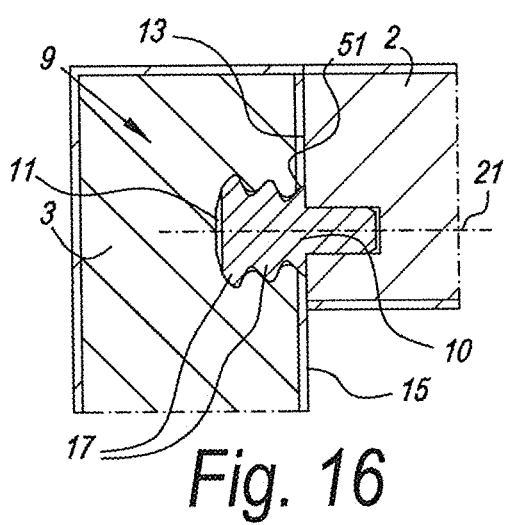

FIG. 16 represents another additional eleventh independent aspect, wherein the male part 10 and the female part 11 are made conical in the depth direction, or wherein the male part 10 comprises a plurality of protrusions 17, wherein these protrusions 17 are situated at different distances from the center line 21 of the male part 10. Preferably, this distance, as here, increases with the depth of the slot 14. In this manner, an extra strong coupling is obtained.

Figure 17:
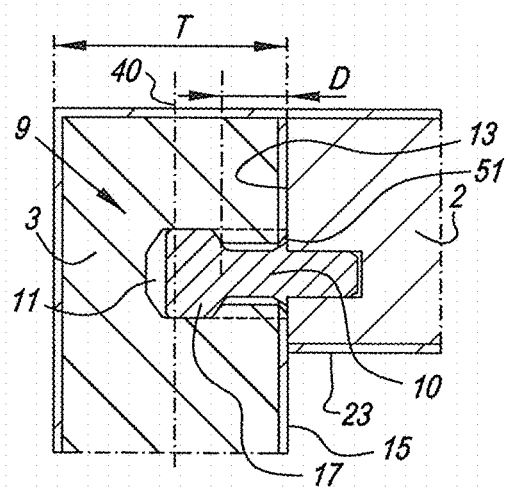

FIG. 17 represents another additional twelfth independent aspect, wherein the female part 11 and/or the male part 10 in coupled condition extends to beyond the central plane 40 of the second furniture part 3, and/or wherein the female part 11 is free from cooperating protrusions 17 and grooves 16 up to at least a depth D of 25% of the thickness T of the second furniture part 3. In this manner, very strong couplings can be obtained. In particular when a compression is striven for, the risk is minimized that such compression would show on the inwardly directed side 15 of the second furniture part 3.

Figure 18:
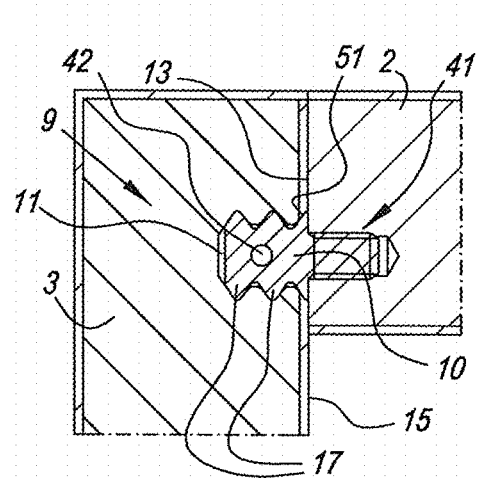

FIG. 18 represents an embodiment with the characteristics of the fourth aspect of the invention, mentioned in the introduction, wherein the male part 10 is gluelessly connected to the first furniture part 2, in that it is attached by means of a screw connection 41. The protruding part of the male part 10 in this case is provided with an eyelet 42 through which a tool can be put to serve as a lever for fixing the screw connection 41.

Figure 19:
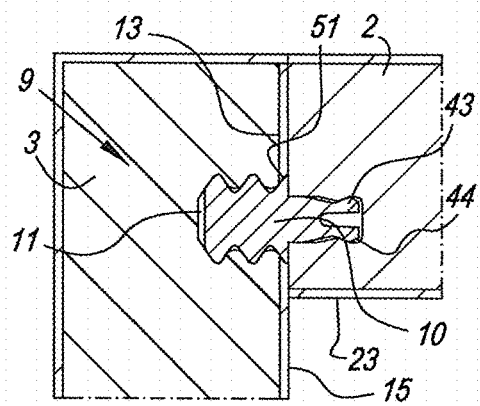

FIG. 19 represents another example of the fourth aspect, wherein said glueless connection consists of a mechanical coupling connection by means of one or more hooks 43 and undercuts 44. Preferably, said hooks 43 allow for a snap connection of the male part 10 in the narrow or distal end 13 of the respective furniture part 2.

Figure 20:
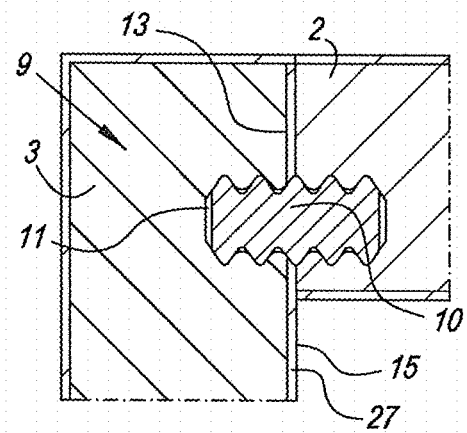
Figure 21:
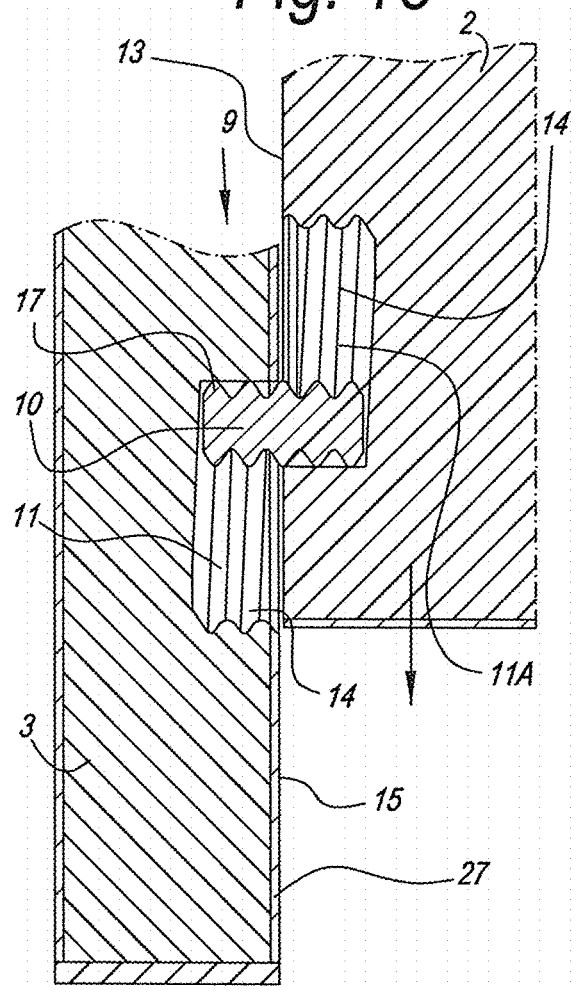
FIG. 21, in a view similar to that of FIG. 7, represents how the embodiment of FIG. 20 can be coupled.

FIGS. 20 and 21 represent another example of the fourth aspect, wherein said glueless connection consists at least of that the male part 10 at its end with which it is connected to the first furniture part 2, or, in other words, at its attachment part, is realized with protrusions 17 and/or grooves 16, which cooperate with a female part 11A, which is also realized in the first furniture part 2 and comprises grooves 16 and/or protrusions 17. In the example, a symmetric male part 10 is obtained which can be connected by the user without the possibility of faults.

FIG. 21 shows that the connection of the male part 10 from FIG. 20 possibly can be performed entirely or partially by means of the same movement by which the furniture parts 2-3 are coupled to each other.

Figures 22, 23:
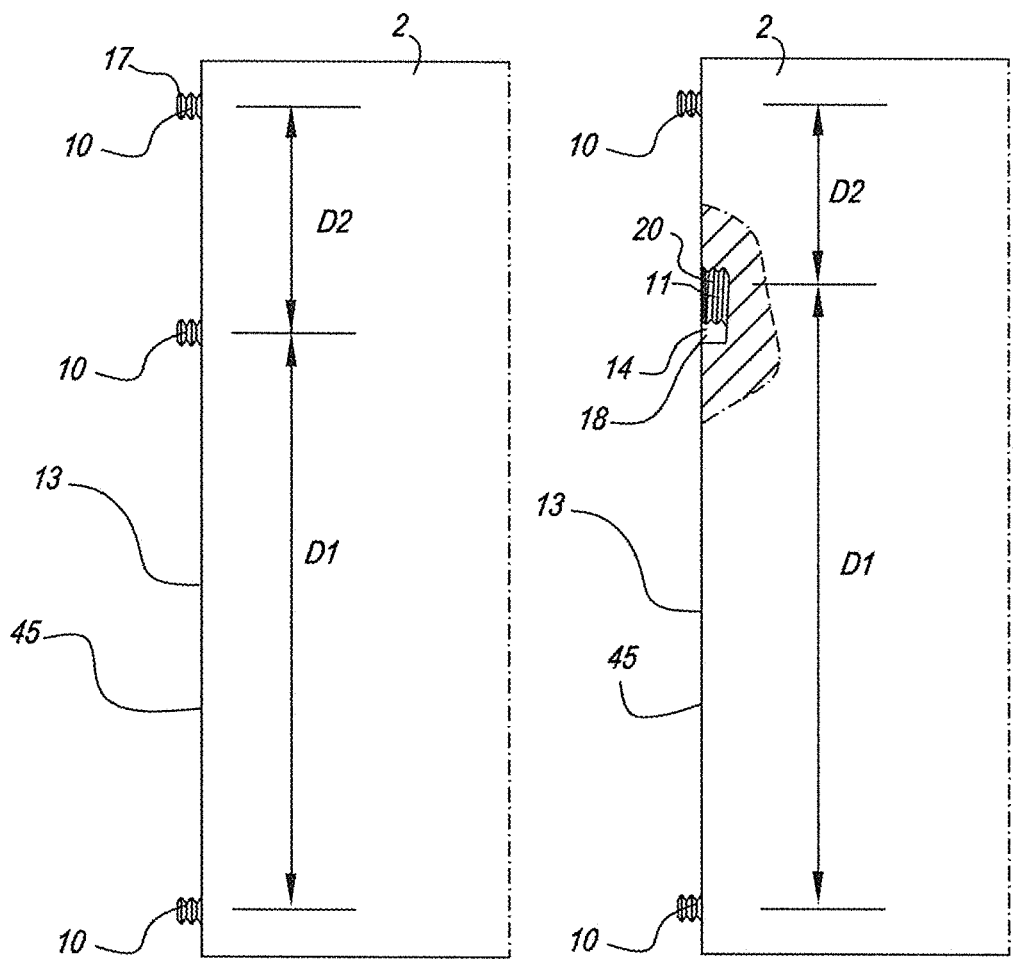
FIG. 22, in a view according to the arrow F22 represented in FIG. 5, represents a furniture part for a piece of furniture having, amongst others, the characteristics of the second aspect.
FIGS. 23 and 24, in similar views, represent a furniture part for a piece of furniture having, amongst others, the characteristics of the fifth and the seventh aspect, respectively, of the invention.

FIG. 22 represents an example of the sixth independent aspect of the invention, mentioned in the introduction, wherein the first furniture part 2 on a first end 45 of two opposite ends 45-46 is provided with at least three male parts 10, and wherein the relation of the distance D1 between a first male part 10 and a second neighboring male part 10 and the distance D2 between this second and a third neighboring male part 10 is at least 1.2.

FIG. 23 represents an example of the fifth independent aspect mentioned in the introduction, wherein the first furniture part 2 on a first of two opposite ends 45-46 is provided with at least a male part 10 as well as with at least a female part 11.

It is clear that FIG. 23 further also forms an example of the sixth independent aspect, wherein the position of the female part 11 is determined by the position of the cooperating therewith male part 10 in the end position 20.

Figure 24:
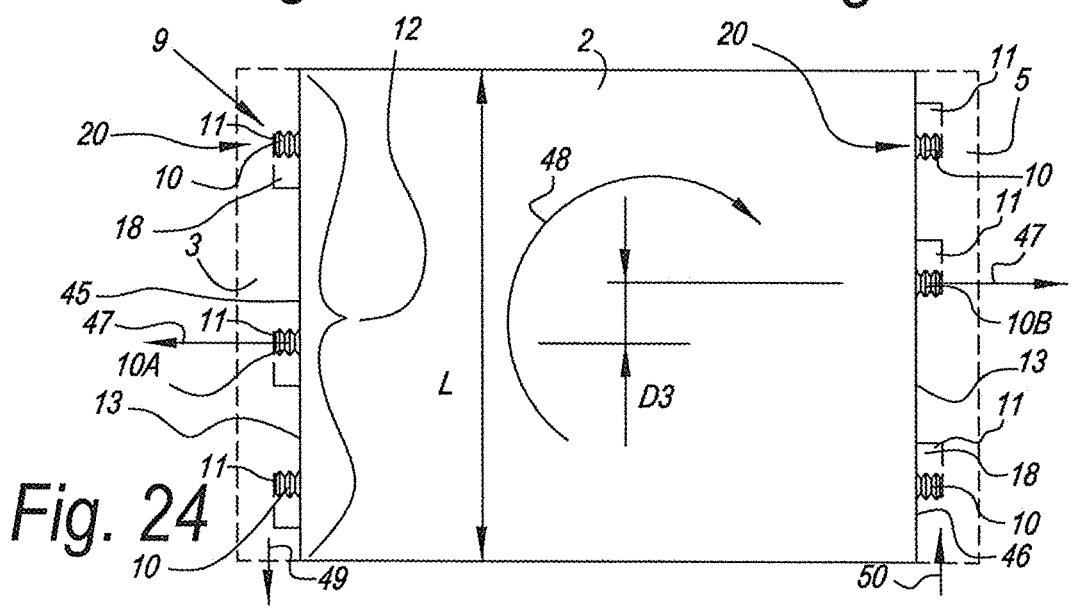

FIG. 24 represents an example of the seventh aspect of the invention, mentioned in the introduction. To this aim, the first furniture part 2, on a first of two opposite ends 45, is provided with at least a first male part 10A, and the first furniture part 2, on a second of these two opposite ends 46, is provided with a second male part 10B, which is least distant from the first male part 10A. In this case, this always relates to the male parts 10A-10B, which are situated centrally along the respective ends 45-46. In respect to the longitudinal direction of the respective ends 45-46, this first and second male parts 10A-10B are shifted in mutual respect over a distance D3. Preferably, the shifting is at least 5 percent of the length L of the respective end, however, preferably at least 10 percent or more.

By such configuration, particular effects can be achieved. FIG. 24 represents that in an attempt to pull the side panels 3-5 away from the top panel according to the arrows 47, a torque effect 48 is created, which pushes the male parts 10-10A-10B more strongly into their end position 20 in the slot 14. In this case, the asymmetric placement thus effects a reinforcement of the whole of the piece of furniture 1. In this case, this is also obtained in that the female parts 11 of both side panels 3-5 are made mirrored. In an analogous manner, it can be provided for that such torque effect leads to a simpler de-installation, namely, in that the torque results in the tendency to push the male parts 10-10A-10B loose from their end position 20, however, this is not represented here.

It is noted that FIG. 24 also forms an example of an additional thirteenth aspect, wherein the first furniture part 2 on at least two opposite ends 45-46 has to be coupled to a second furniture part 3, third furniture part 5, respectively, and wherein the movement of the male parts 10-10A-10B along the female parts 11 for the respective two opposite sides 45-46 is opposed to each other. In the example of FIG. 24, the side panel 3 shown on the left hand side must be shifted in the direction of arrow 49, whereas the side panel 5 shown on the right hand side must be shifted in the opposite direction, namely in the direction of arrow 50, in respect to the top panel 2.

It is clear that many of the mentioned independent aspects can be combined with each other. For example, the features of the tenth aspect thus may be applied in the embodiments of all figures or other aspects.

The eighth independent aspect, too, can be applied broadly. In this respect, it is noted that embodiments of the eighth aspect are represented, amongst others, in FIGS. 2 to 8 and 11 to 21. To this aim, the female part 11 is provided in a side 15 of the second furniture part 3, which is provided with a layer-shaped covering 27. Herein, this respectively relates to furniture parts 2-3 which form an outer side of the piece of furniture 1, and no shelves 7. The male part 10 respectively is provided in a narrow side or narrow end 13 of the first furniture part 2, wherein this end 13 is free from layer-shaped coverings 27. In most cases, the slot 14 comprises a bevel 51 or other chamfer, which is beneficial for the quality of the connection.

It is evident that the coupled to each other first and second furniture parts 2-3 can be formed by any pair of coupled furniture parts. By way of example only, in the figures respectively a top panel is depicted as the first furniture part 2 and a side panel as the second furniture part 3.

Further, it is noted that, although all examples of the figures show male parts 10 with circular or approximately circular cross-sections, these male parts 10 of course also may show other shapes, such as a shape with an oblong cross-section, for example, a wedge shape, analogous to the shape of an insertion wedge in an axis connection. The longitudinal direction of the male part 10 in such case preferably is oriented according to the longitudinal direction of the narrow end 13 of the first furniture part 2.

Further, it is also noted that, although the male part 10 in all examples is realized as a separate insert, this part can also be made in one piece with the first furniture part 2, for example, in that this male part 10 is formed, by means of machining treatments, on the narrow or distal end 13 of the first furniture part 2.

Further, it is clear that the connections of the invention, which are described as a connection between a first and a second furniture part, can also be applied more broadly than for furniture only. For example, they thus may be applied for any connection, at an angle or flat, in boxes, construction panels, floors and the like.

The present invention is in no way limited to the herein above-described embodiments, on the contrary may such furniture and connections be realized according to various variants, without leaving the scope of the present invention.

The invention claimed is:

1. A piece of furniture, comprising:
   a first furniture part defining a first female feature including an insertion opening, and a slot forming engagement elements including grooves and protrusions, the slot communicating with the insertion opening;
   a second furniture part defining a second female feature including an insertion opening and a slot forming engagement elements including grooves and protrusions, the slot communicating with the insertion opening; and
   a male part having a center line and engagement elements including grooves and protrusions extending about the center line;
   wherein the male part is arranged to extend into the insertion openings of the first and second female features, such that movement of the first furniture part relative to the second furniture part urges the engagement elements of the male part into mutual cooperation with the engagement elements of the first and second female features to obtain a coupling of the first furniture part to the second furniture part.

2. The piece of furniture of claim 1, wherein the grooves and protrusions of the first female feature are inclined relative to the grooves and protrusions of the male part.

3. The piece of furniture of claim 2, wherein the grooves and protrusions of the first female feature are inclined at an angle (B) of 2 to 20°.

4. The piece of furniture of claim 2, wherein the male part is symmetrical about the center line and along a length of the male part.

5. The piece of furniture of claim 1, wherein the male part is symmetrical about the center line and along a length of the male part.

6. The piece of furniture of claim 5, wherein the male part defines a circular cross-section.

7. The piece of furniture of claim 1, wherein the male part is defined as a separate insert relative to the first and second furniture parts.

8. The piece of furniture of claim 1, wherein the male part is arranged to be positioned with the center line between a central plane of the first furniture part and an inner side of the first furniture part;
   wherein the slot of the first female feature is positioned between a central plane of the second furniture part and an inner side of the second furniture part.

9. The piece of furniture of claim 1, wherein at least two-thirds of the male part are located between a central plane and an inwardly directed side of the first furniture part.

10. The piece of furniture of claim 1, wherein the insertion opening of the first female feature has a larger diameter than a diameter of the slot.

11. The piece of furniture of claim 10, wherein the center line of the male part is arranged to be aligned with an axis of the diameter of the insertion opening such that coupling occurs by urging the male part toward the slot in at least a longitudinal direction of the slot relative to the axis of the diameter of the insertion opening.

12. The piece of furniture of claim 1, wherein the second female feature is defined along a flat side of the second furniture part with a layered-shaped covering.

13. The piece of furniture of claim 12, wherein the first female feature is defined at a narrow end of the first furniture part.

14. The piece of furniture of claim 1, wherein the insertion opening and the slot of the first female feature define a continuous oblong slot wherein at least a portion of the insertion opening is devoid of the engagement elements.

15. A composed element, comprising:
   a first part defining a first female feature including an insertion opening, and a slot forming engagement elements including grooves and protrusions, the slot communicating with the insertion opening;
   a second part defining a second female feature including an insertion opening and a slot forming engagement elements including grooves and protrusions, the slot communicating with the insertion opening; and
   a male part having a center line and engagement elements including grooves and protrusions extending about the center line;
   wherein the male part is arranged to extend into the insertion openings of the first and second female features, such that movement of the first part relative to the second part urges the engagement elements of the male part into mutual cooperation with the engagement elements of the first and second female features to obtain a glueless coupling of the first part to the second part.

16. The composed element of claim 15, wherein the grooves and protrusions of the first female feature are inclined relative to the grooves and protrusions of the male part.

17. The composed element of claim 16, wherein the grooves and protrusions of the first female feature are inclined at an angle (B) of 2 to 20°.

18. The composed element of claim 15, wherein the male part is symmetrical about the center line and along a length of the male part, wherein the male part is defined as a separate insert relative to the first and second parts.

19. The composed element of claim 15, wherein the male part is arranged to be positioned with the center line between a central plane of the first part and an inner side of the first part; and
   wherein the slot of the first female feature is positioned between a central plane of the second part and an inner side of the second part.

20. A composed element, comprising:
   a first part defining a first female feature including an oblong slot including an insertion opening and a slot extending from the insertion opening and having engagement elements, the insertion opening having a diameter greater than a diameter of the slot, wherein at a least a portion of the insertion opening is devoid of engagement elements;
   a second part defining a second female feature including an oblong slot including an insertion opening and a slot extending from the insertion opening and having engagement elements; and
   a male part having a center line and engagement elements extending about the center line;
   wherein the male part is arranged to extend into the insertion openings of the first and second female features, such that movement of the first part relative to the second part urges the engagement elements of the male part into mutual cooperation with the engagement elements of the first and second female features to obtain a glueless coupling of the first part to the second part;
   wherein the male part is symmetrical about the center line and along a length of the male part, wherein the male part is defined as a separate insert relative to the first and second parts.

* * * * *